(12) United States Patent
Ludlow et al.

(10) Patent No.: US 9,191,886 B2
(45) Date of Patent: Nov. 17, 2015

(54) COMMISSIONING OF WIRELESS DEVICES IN PERSONAL AREA NETWORKS

(71) Applicant: Crestron Electronics, Inc., Rockleigh, NJ (US)

(72) Inventors: Jeffrey Ludlow, Woodcliff Lake, NJ (US); Alina Geormaneanu, River Edge, NY (US)

(73) Assignee: Crestron Electronics Inc., Rockleigh, NJ (US)

( * ) Notice: Subject to any disclaimer, the term of this patent is extended or adjusted under 35 U.S.C. 154(b) by 247 days.

(21) Appl. No.: 13/909,009

(22) Filed: Jun. 3, 2013

(65) Prior Publication Data

US 2013/0322281 A1 Dec. 5, 2013

Related U.S. Application Data

(60) Provisional application No. 61/654,392, filed on Jun. 1, 2012.

(51) Int. Cl.
| | | |
|---|---|---|
| H04W 48/18 | (2009.01) | |
| H04L 12/28 | (2006.01) | |
| H04W 84/18 | (2009.01) | |

(52) U.S. Cl.
CPC .............. *H04W 48/18* (2013.01); *H04L 12/28* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 6,144,855 A * | 11/2000 | Slovin | ......................... | 455/432.1 |
| 6,393,486 B1 * | 5/2002 | Pelavin | ............... | H04L 41/0813 |
| | | | | 709/238 |
| 6,574,266 B1 * | 6/2003 | Haartsen | ............... | H04W 48/10 |
| | | | | 370/349 |
| 7,319,877 B2 * | 1/2008 | Krumm | ................. | G01S 5/0252 |
| | | | | 342/387 |
| 7,933,612 B2 * | 4/2011 | Counts | .................. | G01S 5/0252 |
| | | | | 455/456.1 |
| 8,538,596 B2 * | 9/2013 | Gu | ...................... | H05B 37/0227 |
| | | | | 307/141 |
| 2002/0187780 A1 * | 12/2002 | Souissi | ................. | H04W 48/16 |
| | | | | 455/426.1 |
| 2005/0135379 A1 * | 6/2005 | Callaway, Jr. | ........... | H04L 45/48 |
| | | | | 370/395.31 |
| 2006/0068795 A1 * | 3/2006 | Caspi et al. | ................... | 455/445 |
| 2007/0211681 A1 * | 9/2007 | Sun | ......................... | H04L 45/04 |
| | | | | 370/338 |
| 2008/0068156 A1 * | 3/2008 | Shimokawa | .......... | H04W 84/18 |
| | | | | 340/539.22 |
| 2008/0129494 A1 * | 6/2008 | Kim | ...................... | H04W 8/005 |
| | | | | 340/539.22 |
| 2009/0296652 A1 * | 12/2009 | Rudowicz | ............. | H04W 48/16 |
| | | | | 370/331 |
| 2010/0061272 A1 * | 3/2010 | Veillette | ................... | H04L 45/34 |
| | | | | 370/254 |
| 2010/0069066 A1 * | 3/2010 | Shen et al. | ..................... | 455/434 |
| 2010/0189011 A1 * | 7/2010 | Jing | .................... | H04L 12/2809 |
| | | | | 370/254 |
| 2010/0248715 A1 * | 9/2010 | Lundsgaard | .......... | H04W 48/16 |
| | | | | 455/432.1 |
| 2011/0149803 A1 | 6/2011 | McCormack et al. | | |
| 2012/0124367 A1 * | 5/2012 | Ota | ....................... | H04W 12/04 |
| | | | | 713/153 |
| 2013/0165112 A1 * | 6/2013 | Gopalsamy | ............. | H04W 8/02 |
| | | | | 455/432.1 |

* cited by examiner

*Primary Examiner* — Jeffrey M Rutkowski
*Assistant Examiner* — Jonathan B Wood
(74) *Attorney, Agent, or Firm* — Crestron Electronics, Inc

(57) ABSTRACT

A device joining a wireless network performs a scan and acquire procedure to discover the optimal node in the desired network. The joining device scans all desired channels for a predetermined amount of time. During the scan, the joining device builds a table of discovered networks ranked and truncated according to proximity. Additionally, the joining device curates the list to ensure that only the optimal node from each network is listed. The joining device then attempts to join networks according to the table of discovered networks.

20 Claims, 6 Drawing Sheets

COMMISSIONING OF WIRELESS DEVICES IN PERSONAL AREA NETWORKS

BACKGROUND OF THE INVENTION

1. Technical Field

The present invention relates to wireless networks and more specifically to systems, devices and methods for commissioning a wireless network.

2. Background Art

Control networks in homes are increasingly popular installations. A network of sensors and control devices distributed throughout a residential or commercial building may control and provide information for various elements of the building. For example, one or more control networks in a home may control and monitor lighting, heating, ventilation and air conditioning (HVAC), and audio-visual (AV) equipment.

Increasingly, these control networks comprise one or more personal area networks (PANs) organized as a wireless mesh network and in communication with other PANs and the control system. Generally, mesh networks allow each device to communicate with each other thereby providing multiple possible routes between nodes over which a packet can be routed. This is in contrast to traditional networks in which devices generally communicate through a master or a repeater. In mesh networks, each device is a node and may pass communications along to other devices. This increases both the reliability and range of the networks.

Communication protocols govern the operation of these wireless PANs by governing network formation, communication, interferences and other operational characteristics. For example, one such protocol is the Zigbee protocol from the Zigbee Alliance. Another wireless communication protocol is the infiNET EX protocol from Crestron Electronics, Inc. of Rockleigh, N.J. Based on ZigBee PRO technology, infiNET EX is an extremely reliable and affordable protocol that is employed by 2-way wireless wall box dimmers and switches, lamp dimmers and switches plus thermostats and keypads and other sensors and control devices.

Wireless mesh network devices in a Zigbee or infiNET network may be classified as a PAN coordinator, a full function device (FFD) or a reduced function device (RFD). The PAN coordinator is the device which is responsible for starting the formation of a network. There is only one PAN Coordinator in any network. The PAN coordinator chooses the PAN ID, the 16-bit value which is used to uniquely define a PAN.

An FFD is a device which can route communication packets as part of its normal operation. An FFD may also be called a "router". FFDs form the meshed network topology by establishing communications links to other devices (both FFDs and RFDs). FFDs can act as a sensor or actuator or other type of node.

An RFD is a device which cannot route communication packets. They are always associated with a single FFD and can only participate in the network as an end, or leaf, node.

Wireless mesh networks, such as Zigbee or infiNET networks are formed by an initialization process. Typically, many of configuration properties may be preconfigured prior to initialization. By preconfiguring these properties, an administrator may determine the size and shape of the network. For example, the maximum number of links from the PAN coordinator to the furthest device may influence the shape and size of the network. The maximum number of devices that may connect to a FFD may also determine the shape and size of the network. The PAN coordinator specifies the number of devices that may link to a FFD, as well as how many of these devices may be routers themselves.

The PAN coordinator is responsible for initializing the wireless network. First, the PAN coordinator chooses a suitable radio channel on which to operate.

Next, the PAN coordinator assigns a PAN ID to the network. The PAN ID can be pre-configured or alternatively can be chosen by detecting other networks operating in the same frequency channel and choosing a PAN ID that does not conflict with theirs. The PAN coordinator also assigns a network address to itself. Typically, this address is zero (0).

Once the PAN coordinator is finished configuring itself, it starts itself in PAN coordinator mode. It is then prepared to field queries from other devices wishing to join the network through a commissioning process. Other devices, both FFDs and RFDs, may join the network once the wireless network has been created by the PAN coordinator. The PAN coordinator has the capability to allow other nodes to join. Additionally, FFDs may also allow other nodes to join.

Devices join the network through a commissioning process. First, the new device (i.e. node) scans available channels to find a wireless network. The device then selects a discovered network by choosing a router or network coordinator on that network. Once this is done, the device sends a join message to the desired router or network coordinator, either an FFD on the network or the PAN coordinator.

Often a device will join the first network that it finds. This is less than optimal as the network may not be the desired network, may be an incompatible network. This may lead to a faulty communication link and a suboptimal network mesh.

The desired FFD or PAN coordinator will allow the new device to join the network if it is a permitted device, the FFD or PAN is currently in join mode, and if it has available address space for the new device. The desired FFD or PAN allows the new device to join by assigning it a network address.

There are detractions from the current commissioning process. As mentioned above, crude methods for scanning and joining networks leads to sub-optimal network, increased time to find the correct network and sub-optimal configuration of the network upon joining.

Scan results often arrive in random order with no correlation to distance or suitability. Often the join attempts are made simply in the order the networks are found or worse, one attempt is made with the first network found. Because there is no order of results, the first networks found could be located much further away (and therefore less likely to be correct) than nearby networks. The device may join the incorrect network. As the device attempts to join incorrect networks, the time necessary to join the correct network will increase.

Determining the correct network to attempt to join is important for saving time and aggravation to the installer. Therefore, there is a need for a better commissioning process which includes more robust measures to detect and select networks to join.

SUMMARY OF THE INVENTION

It is to be understood that both the general and detailed descriptions that follow are exemplary and explanatory only and are not restrictive of the invention.

Disclosure of Invention

Accordingly, a need exists for an improved system, device and method for commissioning a wireless personal area network. The embodiments of the present invention provide these advantages and others not specifically mentioned above but described in the sections to follow.

According to a first aspect, the present invention provides a wireless network device comprising a personal area network (PAN) interface configured for communicating with one or more devices over a wireless medium, a memory encoding one or more processor executable instructions, and a processor configured to load the one or more processor-executable instructions when encoded from the memory. The one or more processor-executable instructions, when executed by the processor, cause acts to be performed comprising scanning one or more wireless communication channels for discoverable networks for a predetermined amount of time, receiving network identity information for each of one or more discovered wireless PANs comprising a PAN ID over the one or more wireless communication channels, measuring the received signal strength of each of one or more discovered wireless PANs, dynamically building a ranked table of one or more unique discovered wireless PANs as determined by a combination of a channel ID and the PAN ID of each discovered network and ranked according to signal strength, and attempting to join each wireless PAN in the table in order from strongest received signal strength to weakest received signal strength until a wireless PAN is successfully joined.

According to a second aspect, the present invention provides a wireless network system comprising a network coordinating device, a network joining device and a diagnostic console. The network coordinating device comprises a first personal area network (PAN) interface configured for transmitting network identity information comprising a PAN ID over a wireless communication channel via a communication protocol further comprising a base protocol and a supplemental protocol, and a power over Ethernet (PoE) interface configured for receiving an electric power signal and receiving and transmitting information with a control system. The joining network device comprises a personal area network (PAN) interface configured for communicating with one or more devices over a wireless medium, a memory encoding one or more processor executable instructions, and a processor configured to load the one or more processor-executable instructions when encoded from the memory. The one or more processor-executable instructions, when executed by the processor, cause acts to be performed comprising scanning one or more wireless communication channels for discoverable networks for a predetermined amount of time, receiving network identity information for each of one or more discovered wireless PANs comprising a PAN ID over the one or more wireless communication channels, measuring the received signal strength of each of one or more discovered wireless PANs, dynamically building a ranked table of one or more unique discovered wireless PANs as determined by a combination of a channel ID and the PAN ID of each discovered network and ranked according to signal strength, attempting to both join according to the base protocol and be acquired according to the supplemental protocol by each wireless PAN in the table in order from strongest received signal strength to weakest received signal strength until both a wireless PAN is successfully joined and the joining device is successfully acquired by the wireless PAN, and transmitting the ranked table to a diagnostic console. The diagnostic console comprises a display and is configured for receiving the table of entries from the joining network device and displaying the table of entries on the display.

According to a third aspect, the present invention provides a method for a joining device to be commissioned in a wireless personal area network (PAN). The method comprises the steps of scanning one or more wireless communication channels for discoverable networks for a predetermined amount of time, receiving network identity information for each of one or more discovered wireless PANs comprising a PAN ID over the one or more wireless communication channels, measuring the received signal strength of each of one or more discovered wireless PANs, dynamically building a ranked table of one or more discovered wireless PANs and attempting to join each wireless PAN in the table in order from strongest received signal strength to weakest received signal strength until a wireless PAN is successfully joined. The table is dynamically built by entering the first discovered wireless PAN in the table and for each subsequently discovered wireless PAN comparing both a channel ID and the PAN ID of the wireless PAN to entries in the table. If the channel ID and PAN ID matches an existing entry in the table and the received signal strength of the subsequently discovered wireless PAN is stronger than the received signal strength of the existing entry, The subsequently discovered wireless PAN is added to the table ranked according to received signal strength and the existing entry is removed from the table. If the channel ID and PAN ID matches an existing entry in the table and the received signal strength of the subsequently discovered wireless PAN is weaker than the received signal strength of the existing entry, the subsequently discovered wireless PAN is not added to the table and the existing entry is kept in the table. If the channel ID and PAN ID do not match an existing entry in the table, the subsequently discovered wireless PAN is added to the table ranked according to received signal strength.

BRIEF DESCRIPTION OF DRAWINGS

Figure 1:
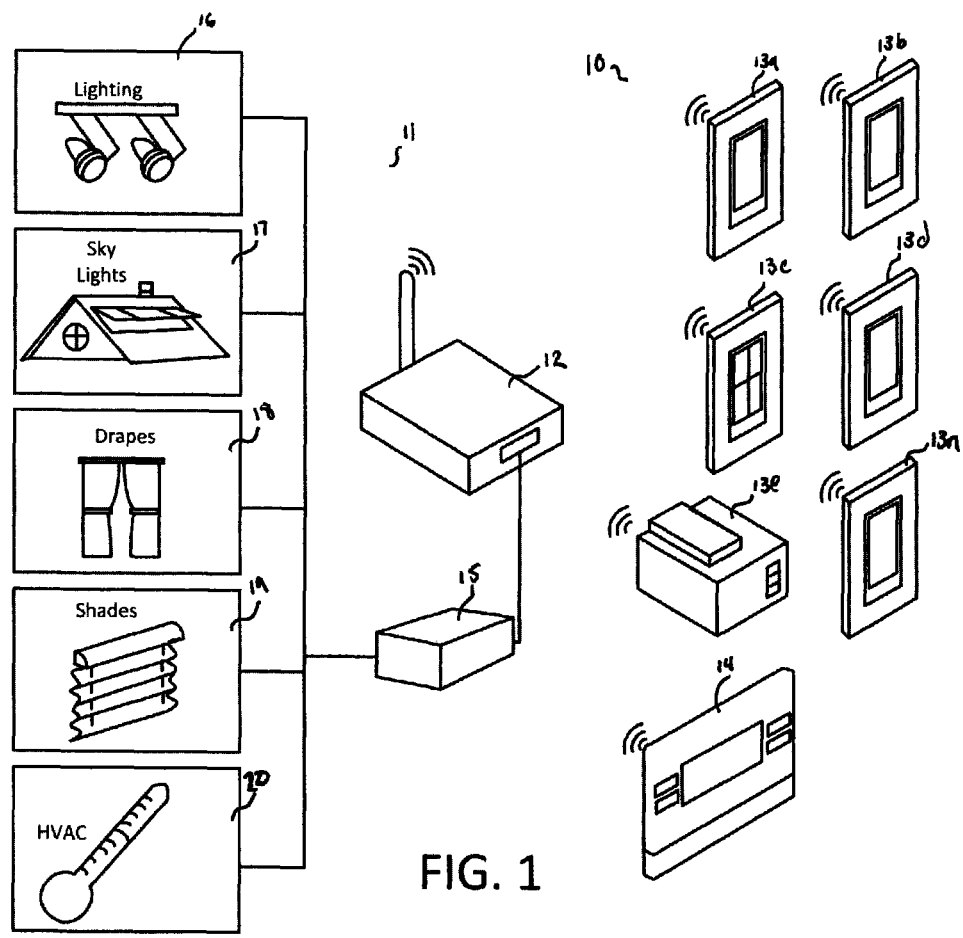

Brief Description of the Several Views of the Drawing

Figure 2:
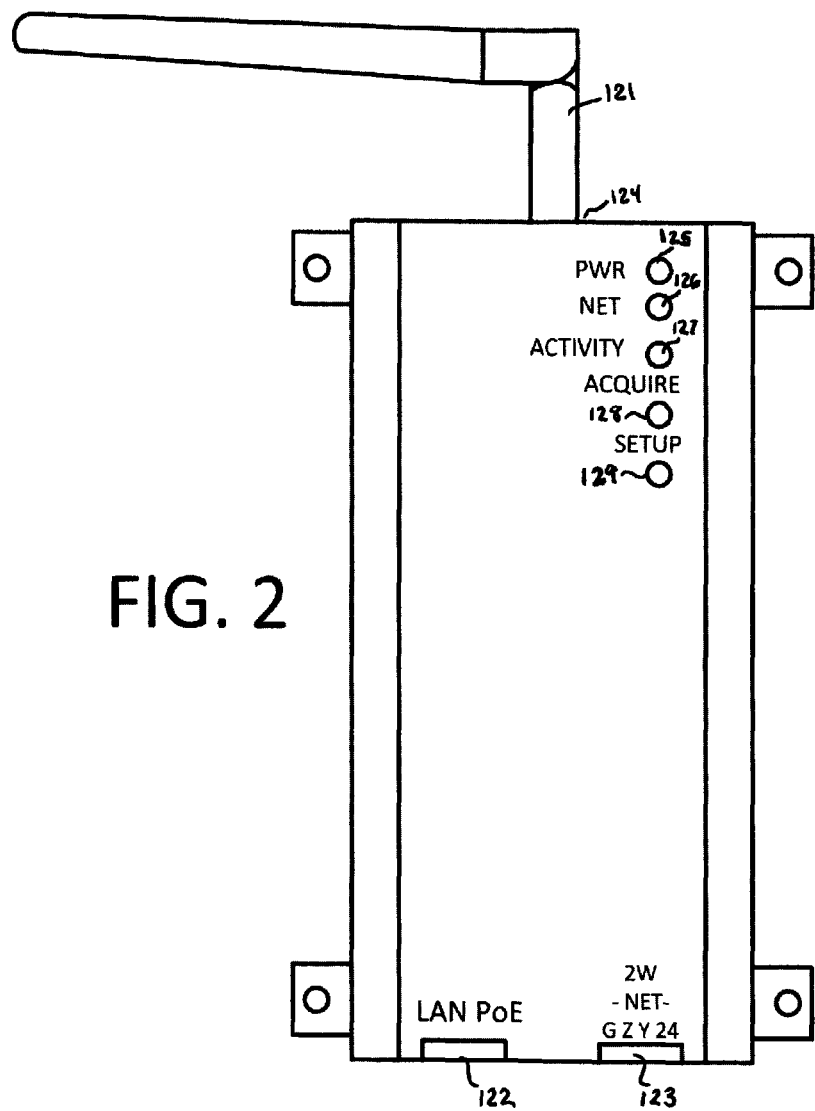

FIG. 1 shows a wireless personal area network, according to an illustrative embodiment of the invention FIG. 2 shows a wireless gateway for use in the wireless personal area network as shown in FIG. 1, according to an illustrative embodiment of the invention.

Figure 3:
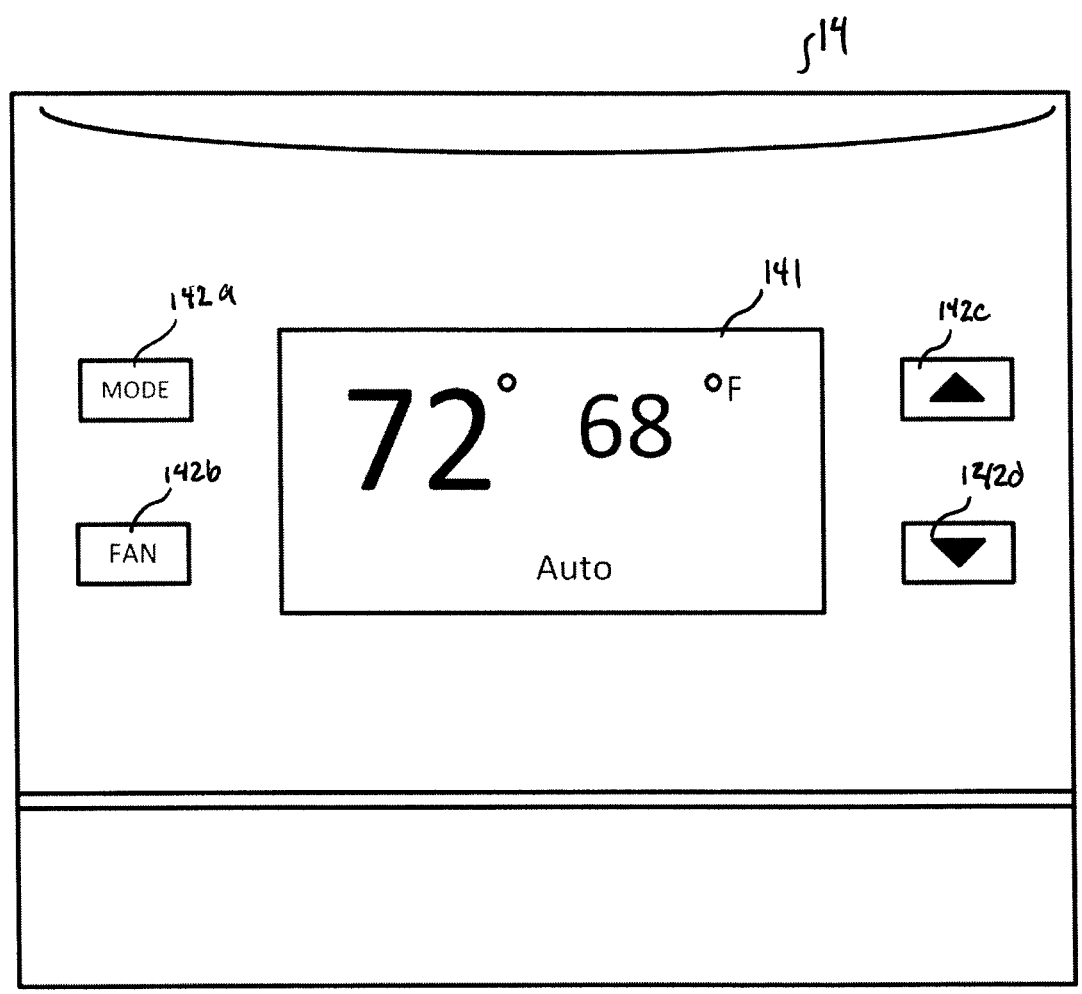

FIG. 3 shows a thermostat for use in the wireless personal area network shown in FIG. 1, according to an illustrative embodiment of the present invention.

Figure 4:
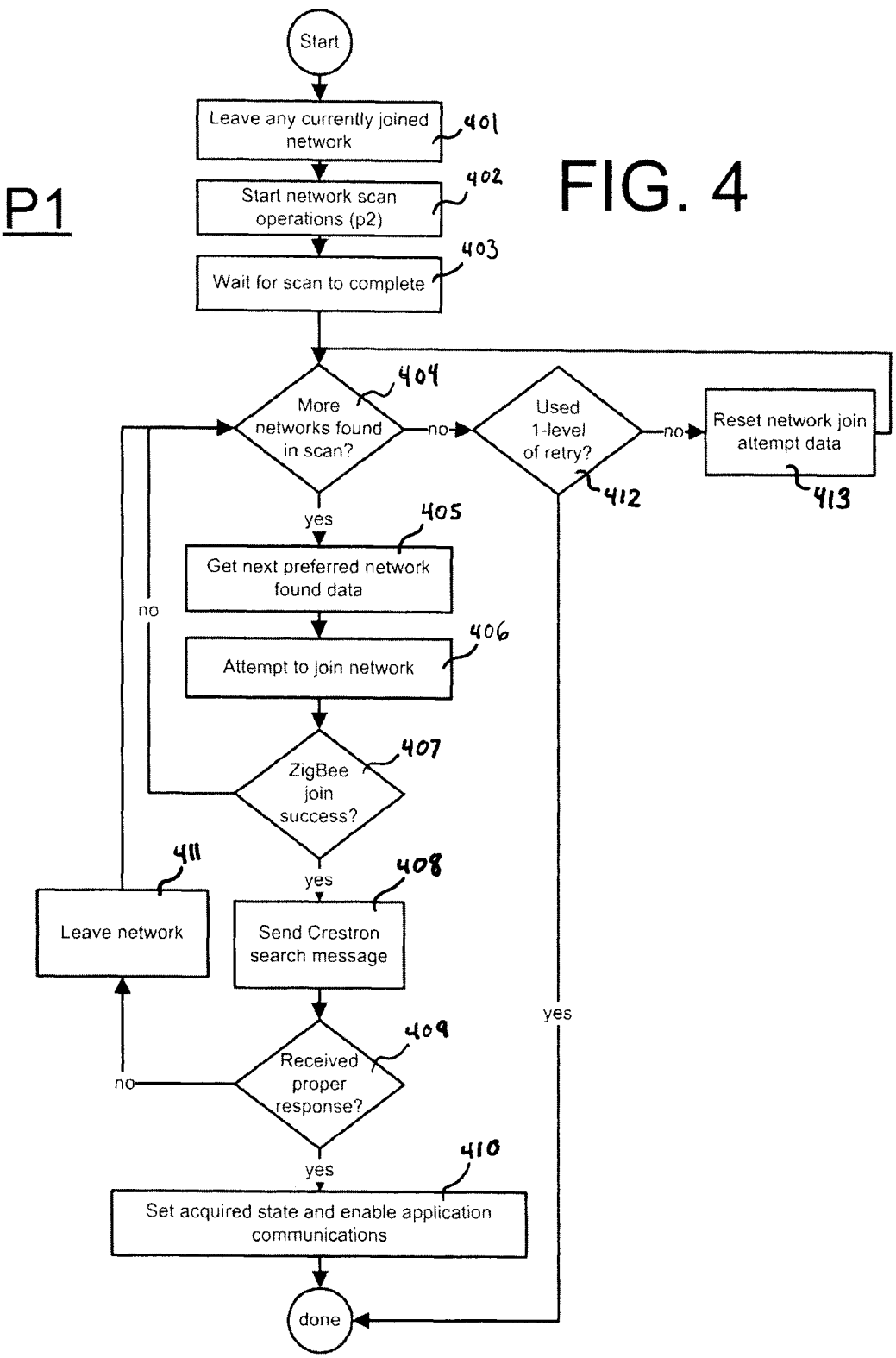

FIG. 4 is a flowchart (P1) showing illustrative steps to perform a method for commissioning a device into a PAN, according to an illustrative embodiment of the invention.

Figure 5:
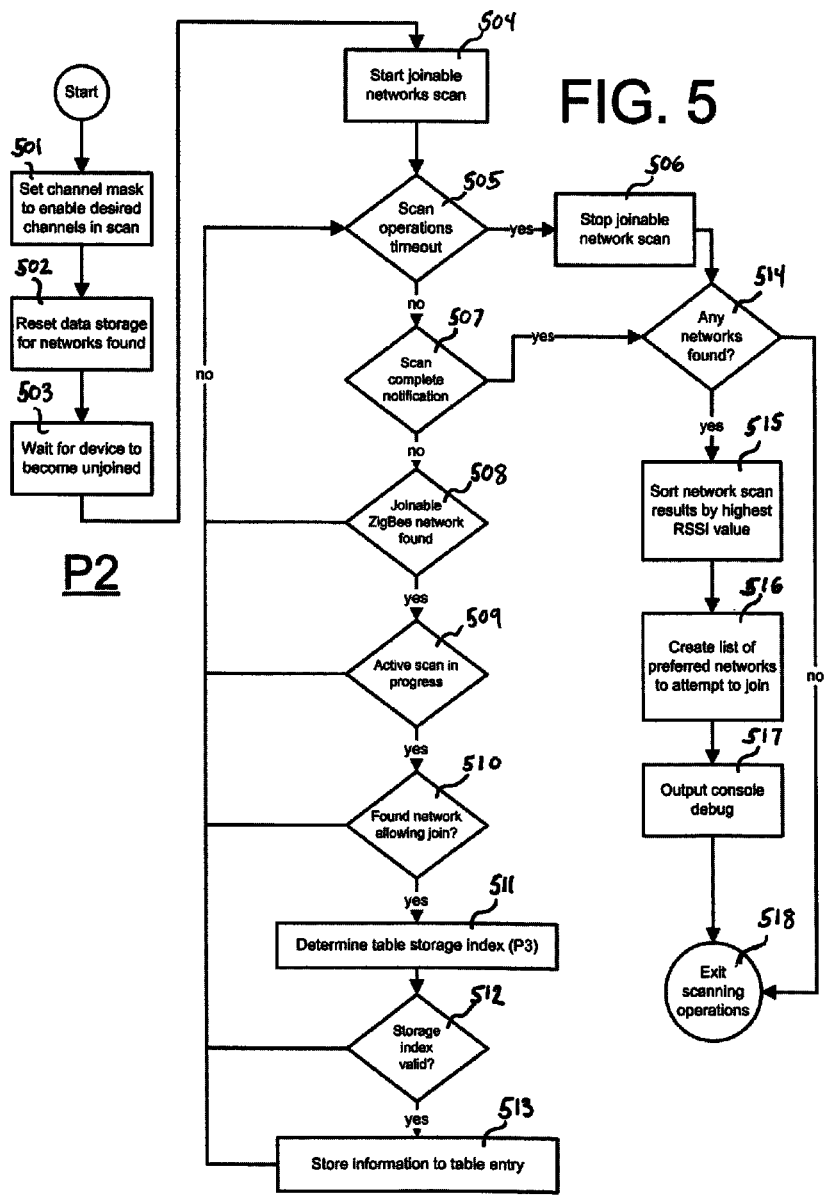

FIG. 5 is a flowchart (P2) showing illustrative steps to perform a method for scanning for networks, according to an illustrative embodiment of the invention.

Figure 6:
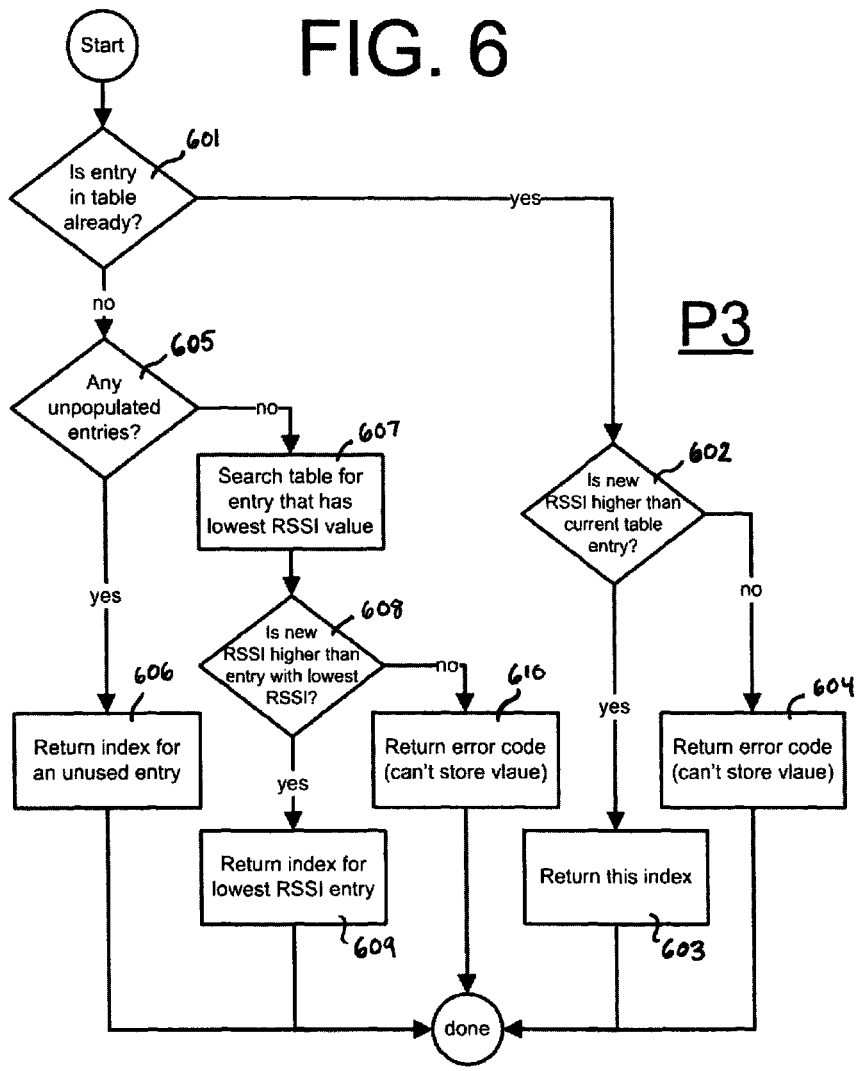

FIG. 6 is a flowchart (P3) showing illustrative steps to perform a method for assigning indexes for a table, according to an illustrative embodiment of the invention.

LIST OF REFERENCE NUMBERS FOR THE MAJOR ELEMENTS IN THE DRAWING

The following is a list of the major elements in the drawings in numerical order.
10 personal area network (PAN)
11 control system
12 gateway
13 collectively the lighting control of 13a, . . . , 13n
14 thermostat
15 control processor
16 lighting elements
17 sky light elements
18 drapery elements 19 shade elements
20 HVAC elements
121 radio frequency transceiver
122 local area network (LAN) power over Ethernet (PoE) interface
123 Cresnet interface
124 antenna connection
125 power light emitting diode (LED)
126 network LED
127 activity LED
128 acquire button
129 setup button
141 display
142a mode button
142b fan button
142c up button
142d down button
401 (step of) leaving any currently joined network
402 (step of) starting network scan operations
403 (step of) waiting for scan to complete
404 (condition of) more networks found in scan
405 (step of) getting next preferred network found data
406 (step of) attempting to join network
407 (condition of) join being successful
408 (step of) sending search message
409 (condition of) receiving proper response
410 (step of) setting acquired state and enabling application communications
411 (step of) leaving network
412 (condition of) using 1-level of retry
413 (step of) resetting network join attempt data
501 (step of) setting channel mask to enable desired channels in scan
502 (step of) resetting data storage for networks found
503 (step of) waiting for device to become unjoined
504 (step of) starting joinable networks scan
505 (condition of) scan operations timeout
506 (step of) stopping joinable network scan
507 (condition of) scan complete notification
508 (condition of) joinable network found
509 (condition of) active scan in progress
510 (condition of) found network allowing join
511 (step of) determining table storage index
512 (condition of) storage index being valid
513 (step of) storing information to table entry
514 (condition of) any networks being found
515 (step of) sorting network scan results by highest RSSI value
516 (step of) creating list of preferred networks to attempt to join
517 (step of) outputting console debug
518 (step of) exiting scanning operations
601 (condition of) entry already being in table
602 (condition of) new RSSI being higher than current table entry
603 (step of) returning index of current table entry
604 (step of) returning error code
605 (condition of) any unpopulated entries
606 (step of) returning index for an unused entry
607 (step of) searching table for entry that has lowest RSSI value
608 (condition of) new RSSI being higher than entry with lowest RSSI
609 (step of) returning index for lowest RSSI entry
610 (step of) returning error code
P1 method for commissioning a device into a PAN
P2 method for scanning for networks
P3 method for determining index value

DETAILED DESCRIPTION OF THE INVENTION

Mode(s) for Carrying Out the Invention

The present invention provides a wireless personal area network (PAN) operating according to a wireless communication protocol and comprising one or more network devices and a joining device. The joining device is configured for employing a commissioning method which allows the joining device to join the optimal PAN by ranking PANs in a table according to desirability. The commissioning method further allows the joining device to curate the table by removing multiple entries from the same PAN and only listing the most desirable node of that PAN.

The preferred embodiment of the present invention is described herein in the context of a PAN operating with proprietary wireless network protocols, the infiNET EX protocols, and comprising a thermostat as the joining device and a wireless gateway as the preferred network device of the PAN, but is not limited thereto. Any device configured for communicating on a wireless network may serve as the joining device. For example, a light controller or a shade motor may be a joining device in the PAN.

The PAN network operating according to Crestron Electronics infiNET EX protocols employ a method which improves the commissioning process for the wireless networks. This improved commissioning method introduces a scan, ranking and curating process to the commissioning method. The joining device will scan one or more predetermined channels for a predetermined time period to discover all discoverable networks on those channels. By allowing the device a predetermined amount of time to scan, the device will ensure that all discoverable networks are discovered prior to attempting to join. Additionally, the discoverable networks are saved in a table and ranked according to likelihood that they may be the correct network, such as by signal strength, thereby increasing the likelihood that the correct network is joined in a more timely manner. Additionally, the table of discoverable networks is curated to remove multiple nodes from the same network by comparing both the channel and network ID of the discoverable network. If more than one node from a network is discovered, only the most preferential entry is kept listed in the table. The preferred node may be determined via signal strength.

This commissioning method increases likelihood that correct network is joined and that it is joined in a timely manner, thereby reducing the time and aggravation of technicians. Further by increasing likelihood that optimal node is selected, this commissioning method reinforces the center-out model of network formation which aids the overall network by forming a good mesh and reinforcing the network.

Specifically, during the commissioning process, networks are scanned for about 260 ms per channel, twice the ZigBee recommendation of 138 ms per channel. In an embodiment of the invention, sixteen ISM channels in the 2.4 GHz band are scanned. Specifically, IEEE 802.15.4 channels 11 through 26 are scanned. Each time a joinable network is found, it is placed into a table of joinable networks. The table may be of finite length dependent on a variety of factors such as memory capability. For example, the table entries may be limited to four. Once four unique networks have been found and the table is filled, the entry with the lowest signal strength is replaced each time a new network with a stronger signal strength is found. Signal strength may be measured by received signal strength indication (RSSI).

Scans can return multiple hits for the same network, so no entry can have the same channel/PAN ID combination as another. By employing a combination of channel and PAN ID, the commissioning method takes into account that although usually the PAN ID is unique among two networks, this isn't necessarily always true. After scanning, the networks are sorted by best signal strength and the device attempts to join and be acquired by each one, stopping at the first successful join and acquire.

FIG. 1 shows a wireless PAN operating according to infiNET protocols and connected to a control system 11. The wireless PAN 10 comprises one or more network devices such as a wireless gateway 12 acting as a PAN coordinator and communicating with a variety of network devices including a plurality of lighting controls 13a-n, a thermostat 14, a wireless expander (not shown) and a touch panel (not shown). In an embodiment of the invention, the PAN 10 may be operating according to a proprietary communication protocol, such as infiNET EX protocols. In this embodiment, the wireless gateway 12 may be a CEN-RFGW-EX infiNET EX wireless gateway 12 available from Crestron Electronics, Inc. of Rockleigh, N.J. The lighting controls 13 may comprise infiNET EX wall box controls such as CLW-DIMEX-P and CLW-DIMSWEX-P and a dimmer such as a CLW-LDIMEX infiNET EX lamp dimmer, all available from Crestron Electronics, Inc. of Rockleigh N.J. The wireless expander may be a CLW-EXPEX infiNET wireless expander available from Crestron Electronics, Inc. of Rockleigh NJ. The touch panel may be a MTX-3 Isys™ 2.8" Handheld Wireless Touch Panel w/infiNET EX also available from Crestron Electronics, Inc. of Rockleigh N.J.

Those skilled in the art will recognize that additional devices may operate on the network. Any device capable of communicating on a PAN 10, such as AV controls, HVAC elements, security elements and other residential or commercial control and monitoring devices, may be part of the system shown in FIG. 1. For example, the wireless PAN 10 may also comprise HVAC controls, such as a CHV-TSTATEX thermostat 14 available from Crestron Electronics, Inc. of Rockleigh N.J. or shade controls such as CSC shade controls also available from Crestron Electronics, Inc. of Rockleigh N.J.

The control network 12 may comprise a control processor 15 configured for controlling one or more controllable elements of a residential or commercial structure either directly or via intermediate components. For example, the control processor 15 may control lighting elements 16, sky light elements 17, drapery elements 18, shade elements 19, and HVAC elements 20.

FIG. 2 shows a wireless gateway according to an illustrative embodiment of the present invention. The wireless gateway 12 is configured for acting as a PAN coordinator and managing network configurations. Additionally, the wireless gateway 12 is configured for serving as a gateway 12 for the PAN 10 to communicate with a control system 11. The wireless gateway 12 may be a CEN-RFGW-EX wireless gateway 12 available from Crestron Electronics, Inc. The CEN-RFGW-EX wireless gateway 12 is a two-way RF gateway\transceiver designed to enable communications and management for a complete infiNET EX wireless network of dimmers, keypads, remotes and other devices. The CEN-RFGW-EX wireless gateway 12 links the infiNET EX network to a Crestron control system via a wired connection such as Ethernet or Cresnet. Up to one hundred infiNET EX dimmers, switches, keypads, thermostats 14 and other devices can be linked to a control system 11 via a single CEN-RFGW-EX gateway 12. Additional gateways may be installed to support more devices with up to sixteen gateways possible in a complete system. Wireless expanders may be added wherever needed to extend the network by filling in gaps between devices.

The wireless gateway 12 may include at least one central processing unit (CPU). For example, the CPU may represent one or more microprocessors, and the microprocessors may be "general purpose" microprocessors, a combination of general and special purpose microprocessors, or application specific integrated circuits (ASICs). Additionally or alternatively, the CPU may include one or more reduced instruction set (RISC) processors, video processors, or related chip sets. The CPU may provide processing capability to execute an operating system, run various applications, and/or provide processing for one or more of the techniques described herein. Applications that may run on the wireless gateway 12 may include, for example, software for initiating a PAN 10 and communicating on a control system 11.

A main memory may be communicably coupled to the CPU, which may store data and executable code. The main memory may represent volatile memory such as RAM, but may also include nonvolatile memory, such as read-only memory (ROM) or Flash memory. In buffering or caching data related to operations of the CPU, the main memory may store data associated with applications running on the wireless gateway 12.

The wireless gateway 12 may also include nonvolatile storage. The nonvolatile storage may represent any suitable nonvolatile storage medium, such as a hard disk drive or nonvolatile memory, such as Flash memory. Being well-suited to long-term storage, the nonvolatile storage may store data files, software (e.g., for implementing functions on the wireless gateway 12 13), and wireless connection information (e.g., information that may enable media device to establish a wireless connection such as a telephone connection).

One or more network interfaces may provide connectivity for the wireless gateway 12. The network interfaces may represent, for example, one or more network interface cards (NIC) or a network controller. In certain embodiments, the network interface may include a personal area network (PAN) interface 121, such as a two-way RF transceiver 121. The PAN interface 121 may provide capabilities to network with, for example, a Bluetooth® network, an IEEE 802.15.4 (e.g., ZigBee) network, or an ultra wideband network (UWB). As should be appreciated, the networks accessed by the PAN interface 121 may, but do not necessarily, represent low power, low bandwidth, or close range wireless connections. The PAN interface 121 may permit one electronic device to connect to another local electronic device via an ad-hoc or peer-to-peer connection.

The network interface may also include one or more local area network (LAN) interfaces, such as a control network interface. The LAN interface may represent an interface to a wired Ethernet-based network, but may also represent an interface to a wireless LAN, such as an IEEE 802.11 x wireless network. The range of the LAN interface may generally exceed the range available via the PAN interface. Additionally, in many cases, a connection between two electronic devices via the LAN interface may involve communication through a network router or other intermediary device.

The LAN PoE interface 122 is an 8-wire RJ-45 female connection with two LED indicators. The cresnet interface 123 is a 4-pin 3.5 mm detachable terminal block providing an interface for cresnet proprietary communications on a LAN. The Power over Ethernet (PoE) interface 122 is configured for receiving both an electric power signal and an information signal from a control network. For example, the Power over Ethernet interface 122 may be connected through category 5 cable (CAT 5) to a local area network (LAN) which contains both a power supply and multiple control points and signal generators. Through the PoE interface 122 or cresnet interface 123, the gateway 12 may interface with a control system 11. For example, the wireless gateway 12 may communicate with a control processor 15, such as a PRO3 available from Crestron Electronics, Inc.

The wireless gateway 12 comprises one or more connectors, indicators and interface buttons. The wireless gateway 12 comprises an antenna connection 124 for the supplied antenna. The wireless gateway 12 further comprises a power LED 125, network LED 126 and activity LED 127. The power LED 124 is a LED indicating that operating power is being supplied whether from the Cresnet network or PoE connection. The network LED 126 indicates communication with the Cresnet system. The activity LED 127 indicates wireless communications, such as with the elements of the wireless PAN 10.

The wireless gateway 12 further comprises an acquire button 128 and a setup button 129. The acquire button 128 and setup button 129 are recessed push buttons each with an indicator LED. The acquire button 128 is employed to configure communication with the PAN 10 and the setup button 129 is employed to configure communication with the control network.

The wireless gateway 12 is placed in acquire mode via the Acquire button. The associated LED will indicate that the gateway 12 is in acquire mode. Once the gateway 12 is placed in acquire mode, the joining device may be brought into range and placed in acquire mode to be acquired by the gateway 12. The joining device will be automatically acquired by the wireless gateway 12. By placing the acquire button 128 a second time, the wireless gateway 12 will exit acquire mode as indicated by the acquire button 128.

FIG. 3 shows a thermostat for use in the wireless PAN shown in FIG. 1. The thermostat 14 may be a CHV-TSTATEX thermostat 14 available from Crestron Electronics, Inc. of Rockleigh, N.J. The CHV-TSTATEX thermostat 14 may operate on the wireless PAN 10 by joining the network and being acquired by the gateway 12 as described below in regard to FIGS. 4-6.

The CHV-TSTATEX thermostat 14 is configured for heating and cooling control of baseboard, forced air, heat pump and dual fuel heat pump HVAC systems. The CHV-TSTATEX thermostat 14 is further configured for communicating on a wireless PAN 10.

The thermostat 14 may include at least one central processing unit (CPU). For example, the CPU may represent one or more microprocessors, and the microprocessors may be "general purpose" microprocessors, a combination of general and special purpose microprocessors, or application specific integrated circuits (ASICs). Additionally or alternatively, the CPU may include one or more reduced instruction set (RISC) processors, video processors, or related chip sets. The CPU may provide processing capability to execute an operating system, run various applications, and/or provide processing for one or more of the techniques described herein. Applications that may run on the thermostat 14 may include, for example, software for communicating on a PAN 10 and controlling one or more HVAC elements 20.

A main memory may be communicably coupled to the CPU, which may store data and executable code. The main memory may represent volatile memory such as RAM, but may also include nonvolatile memory, such as read-only memory (ROM) or Flash memory. In buffering or caching data related to operations of the CPU, the main memory may store data associated with applications running on the thermostat 14.

The thermostat 14 may also include nonvolatile storage. The nonvolatile storage may represent any suitable nonvolatile storage medium, such as a hard disk drive or nonvolatile memory, such as Flash memory. Being well-suited to long-term storage, the nonvolatile storage may store data files, software (e.g., for implementing functions on the thermostat 14), and wireless connection information (e.g., information that may enable media device to establish a wireless connection).

One or more network interfaces may provide connectivity for the wireless gateway 12. The network interfaces may represent, for example, one or more network interface cards (NIC) or a network controller. In certain embodiments, the network interface may include a personal area network (PAN) interface, such as a two-way RF transceiver. The PAN interface may provide capabilities to network with, for example, a Bluetooth® network, an IEEE 802.15.4 (e.g., ZigBee) network, or an ultra wideband network (UWB). As should be appreciated, the networks accessed by the PAN interface may, but do not necessarily, represent low power, low bandwidth, or close range wireless connections. The PAN interface may permit one electronic device to connect to another local electronic device via an ad-hoc or peer-to-peer connection.

The thermostat 14 may also include a wired input/output (I/O) interface for a wired interconnection between one electronic device and another electronic device. The wired I/O interface may represent, for example, a universal serial bus (USB) port or an IEEE 1394 or FireWire® port, but may also represent a proprietary connection.

The thermostat 14 further comprises an LCD display 141 and one or more user interface buttons 142. The thermostat 14 is placed in acquire mode via a series of menus displayed on the LCD display 141. Selections are made via the one or more user interface buttons 142. For example, the user may enter a setup mode by pressing and holding a fan button 142b. While the fan button 142b is being held, the user may then simultaneously press and hold both the up button 142c and the down button 142d for five (5) seconds to enter setup mode. Once in setup mode, the thermostat 14 may be placed in acquire mode by actuating the mode button 142a twice and then selecting either the up button 142c or down button 142d. The LED display 141 will indicate that the thermostat 14 is performing the scan and acquire process by flashing a "- - -" on the display. Upon completion of the scan and acquire process, the LED display 141 will indicate a "00" if the thermostat 14 has successfully been acquired or an "E#" to indicate an error where # indicates an error code. For example, the error codes "E1", "E2" and "E3" may correspond to the following conditions, respectively: no gateway found, gateway found but device rejected, and radio operation not available.

The wireless PAN 10 may further comprise a diagnostic console. As described above, the interface for joining devices such as a thermostat 14 may be limited in functionality and not capable of providing adequate information to an installer of a wireless PAN 10. The diagnostic console may be a dedicated device or may represent an added functionality of an existing device such as a tablet computer or smart phone.

One or more network interfaces may provide connectivity for the diagnostic console. The network interfaces may represent, for example, one or more network interface cards (NIC) or a network controller. In certain embodiments, the network interface may include a personal area network (PAN) interface, such as a two-way RF transceiver. The PAN interface may provide capabilities to network with, for example, a Bluetooth® network, an IEEE 802.15.4 (e.g., ZigBee) network, or an ultra wideband network (UWB). As should be appreciated, the networks accessed by the PAN interface may, but do not necessarily, represent low power, low bandwidth, or close range wireless connections. The PAN interface may permit one electronic device to connect to another local electronic device via an ad-hoc or peer-to-peer connection.

The diagnostic console may also include a wired input/output (I/O) interface for a wired interconnection between one electronic device and another electronic device. The wired I/O interface may represent, for example, a universal serial bus (USB) port or an IEEE 1394 or FireWire® port, but may also represent a proprietary connection.

The network interface may be configured to receive diagnostic information from the joining device and a display for displaying the diagnostic information. For example, the diagnostic console may receive and display the table of discovered networks from the joining device. In another embodiment of the invention, the diagnostic console may perform its own commissioning process and thereby generate its own table of entries for discoverable networks which may be more than four or may list every discoverable device. This console will allow technicians to diagnose problem installations and help them understand the wireless environment in which devices are placed.

The diagnostic console may further comprise one or more user interface elements for receiving and displaying information. For example, the one or more user interface elements may comprise one or more buttons, a keypad, a touch screen, a microphone, a speaker and indicator lights.

As described above, a joining device when attempting to join a wireless PAN 10 and be acquired by a gateway may detect more than one wireless PAN 10 as well as more than one node from the same wireless PAN. The wireless PAN devices, such as the thermostat 14 and lighting controls 13, when joining a wireless PAN 10 follow a commissioning routine more involved than traditional methods to ensure that the desired network is joined through an optimal node in that network.

For example, referring to the infiNET EX system above, the CEN-RFGW-EX wireless gateway 12 is the PAN coordinator of the PAN shown. To commission a CHV-TSTATEX thermostat 14 in this system, the user will place the CEN-RFGW-EX wireless gateway 12 in acquire mode and the CHV-TSTATEX thermostat 14 in acquire mode. The CHV-TSTATEX thermostat 14 and CEN-RFGW-EX wireless gateway 12 will then begin the commissioning method shown in FIGS. 4, 5 and 6 to commission the thermostat 14 in the network administered by the CEN-RFGW-EX wireless gateway 12. The CHV-TSTATEX thermostat 14 may discover more networks than the desired network.

FIGS. 4, 5, and 6 provide further details of this improved commissioning method. FIG. 4 is a flowchart (P1) showing illustrative steps to perform a method for commissioning a device into a PAN, according to an illustrative embodiment of the invention. Incorporated within the method for commissioning is a method for scanning for networks. FIG. 5 is a flowchart (P2) showing illustrative steps to perform a method for scanning for networks, according to an illustrative embodiment of the invention. Incorporated with the method for scanning for networks is a method for entering entries in a table. FIG. 6 is a flowchart (P3) showing illustrative steps to perform a method for assigning indexes for a table, according to an illustrative embodiment of the invention.

The methods shown in FIGS. 4, 5, and 6 will be described in the context of a joining device being commissioned in a wireless PAN coordinated by a wireless gateway and governed according to infiNET EX protocols.

In step 401, a joining device, such as a thermostat 14 or lighting control 13, leaves any wireless network that it might currently be joined. According to the wireless communication protocol governing the wireless PAN, this may involve the transmission of one or more message between the joining device and a device in the previous wireless network to formally end communication between the joining device and to remove the joining device from that network.

In step 402, the joining device starts network scan operations (P2) which will be described in detail in reference to FIG. 5 which is a flowchart showing the steps of the network scan operations. The network scan operations produces a table of entries comprising one or more wireless networks organized according to the received signal strength of each wireless network. As described earlier, the table of entries may be limited to a predetermined number of the most preferential wireless networks as determined by RSSI. Additionally, the table may be curated to remove duplicate wireless networks where the stronger of the duplicate will be listed. For example, in an embodiment of the invention, the table is limited to four (4) unique entries of wireless networks, with the four being the wireless networks with the strongest RSSI. As will be described later, the table is vetted to remove duplicate devices from the same wireless network.

In step 403, the joining device waits for the scanning operation to complete. The scanning operation is complete after scanning all desired channels. In an embodiment of the invention, the scanning operation is complete after scanning sixteen ISM channels in the 2.4 GHz band. Specifically, IEEE 802.15.4 channels 11 through 26 are scanned.

The joining device then executes a join and acquire loop comprising steps 405 through 411. If the condition of more wireless networks being discovered by the network scan operation 404 is positive, the joining device identifies the first network (i.e. the network with the strongest received signal) in step 405.

In step 406, the joining device attempts to join the first network. The joining device may attempt to join by executing a handshake procedure with the initiating device. In an embodiment of the invention, the joining device may attempt to join a network by executing the join procedure of the Zigbee protocol. The joining device may execute a handshake procedure with the network device after requesting to join the wireless PAN. The PAN coordinator may then issue a response comprising a PAN address to use while associated with the network.

If the attempt to join the network is unsuccessful, (condition 407) the joining device exits the join and acquire loop and restarts the loop by getting the next preferred network (i.e. the network with second strongest received signal) in step 405. The joining device completes this loop with each subsequent table entry until a wireless network is successfully joined.

Once a wireless network has been successfully joined, the joining device initiates an acquire procedure in step 408. The acquire procedure is a supplemental step which allows for acquisition by a gateway and communication on a supplemental communication protocol, such as the infiNET EX network. The acquire procedure comprises an additional handshake between the joining device and the wireless gateway 12 initiated by the joining device transmitting a Crestron infiNET EX search message.

If the joining device receives the proper response (condition 409), the joined device sets the acquired state and enables application communications in step 410.

If the joining device is not successfully acquired, in this embodiment if it does not receive the proper response to the infiNET EX search message, the joining device exits the acquire process by leaving the joined network in step 411. The joining device then restarts the join and acquire loop by getting the next preferred network in step 405.

If the joined device does not successfully join and acquire a wireless network after attempting all entries in the table, the joining device determines whether one-level of retry has been used (condition 412). If one-level of retry has not been used, in step 413, the joining device resets the network join attempt data and retries the join and acquire loop starting with the first table entry.

FIG. 5 is a flowchart showing illustrative steps to perform a method for scanning for networks, according to an illustrative embodiment of the invention. As described above, the method for scanning for networks is a component of the overall method for commissioning a device into a PAN.

In step 501, the channel mask is set to enable the desired channels in the scan. In an embodiment of the invention, the channel mask is set to sixteen to scan all sixteen ISM channels in the 2.4 GHz band. Specifically, IEEE 802.15.4 channels 11 through 26 are scanned In step 502, the data storage for networks found is reset in order to allow for a new scan. By resetting the data storage, the table of entries of discovered networks is reset.

In step 503, the joining device ensures that the device is not joined to a wireless network while the scan is in progress by waiting for the device to become unjoined from any currently joined network.

In step 504, the joining device starts a joinable networks scan. The joinable network scan comprises a loop process with two out conditions. The first out condition is a scan operations timeout 505. The scan operations timeout is a predefined amount of time in which the scan will stop regardless of the status of the scan. Upon the predefined period of time expiring, the joinable network scan is stopped in step 506. The second out condition is a scan complete notification 507. The scan complete notification is affirmative upon all channels being scanned for the predetermined amount of allotted time.

If neither the scan operation timeout or scan complete notification conditions are affirmative, the joinable network scan process is active. An index determination process (P3) is implemented in step 511, upon three other conditions being met. The three conditions are: the condition of whether a joinable PAN network was found 508; the condition of whether an active scan is in progress 509; and the condition of whether the found network is allowing a join 510. If all three conditions are in the affirmative, the index determination process is implemented for the found network. If the three conditions are not in the affirmative, the joinable network scan process is continued.

As will be described in further detail below in reference to FIG. 6, the index determination process returns a storage index value. If the condition that the storage index is valid 512 is met, the network information is stored as a table entry in step 513. If the condition that the stored index is valid is not met, the network information is not stored as a table entry.

Upon the joinable network scan being stopped, either via the scan operation timeout being met or the scan complete notification being met, if the condition of networks being found 514 is met, the table is completed. In step 515, the network scan results are sorted according to a preference indicator. In an embodiment of the invention, the preference indicator is proximity and network scan results are sorted by highest RSSI value. The ranking may also be done in the index value process P3 detailed in FIG. 6.

The rest of this specification will describe in terms of RSSI value but other factors may be used to rank wireless networks according to proximity. Additionally, the preference indicator may be something other than proximity.

In step 516, the list of preferred networks to attempt to join is created from the table of entries returned.

In step 517, the list of preferred networks is output to a diagnostic console. In an embodiment of the invention, the joining device transmits the list of preferred networks on a wireless communication channel via a PAN interface or a LAN interface. However, may be a wired connection as well. In an alternate embodiment, the diagnostic console may run its own scan procedure to generate a list of table entries.

FIG. 6 is a flowchart showing illustrative steps to perform a method for determining a table storage index value, according to an illustrative embodiment of the invention. As described above, the method for determining a table storage index value is a component of the overall method for commissioning a device into a PAN.

Upon a network being discovered, the joining device determines a table storage index value for the newly discovered network. The joining device first determines the condition of whether the network is entered into the table already 601. Advantageously, the joining device employs the combination of the channel and PAN ID to make this determination. Although PAN IDs typically should be unique across all channels, it is not guaranteed that they will be. However, PAN IDs will always be unique on each channel.

If the entry is already entered in the table, the joining device determines the condition of whether the new entry has a higher RSSI than the entry already in the table 602.

If the new entry does have a higher RSSI value than the current entry, in step 603 the index for the current entry is returned and the new entry replaces the current entry. The new entry will be stored in the returned index during the method for scanning networks P2. If the new entry does not have a higher RSSI value than the current entry, in step 604, an error code is returned and the new entry will not be entered into the table during the method for scanning networks P2.

If the condition that the entry is already entered in the table 601 is negative, the joining device determines the condition of whether there are any unpopulated entries in the table 605.

If there are unpopulated entries, in step 606 an index for an unused entry is returned. The newly discovered network will be entered into the table at that index during the method for scanning networks P2.

If there are no unpopulated entries, in step 607, the table is searched for the entry with the lowest RSSI value.

The joining devices determines the condition of whether the RSSI value for the new entry is higher than the RSSI value of the entry with the lowest RSSI value 608.

If the RSSI value of the new entry is higher than the RSSI value of the lowest entry, in step 609, the index value of the lowest entry is returned and the new entry replaces the current lowest entry. The new entry will be stored in the returned index during the method for scanning networks P2. If the new entry does not have a higher RSSI value than the current lowest entry, in step 610, an error code is returned and the new entry will not be entered into the table during the method for scanning networks P2.

Certain improvements to the commissioning method and PAN are contemplated. In a further embodiment of the invention, the joining device may rank the discovered networks according to an alternative or additional factor. For example, the joining device may rank the networks according to signal strength and the feasibility of a network. For example, the new device may be capable of discarding unrealistic networks based on their signal strength. In other words, the device may make a common sense adjustment to the list of table entries based on signal strength. If the signal strength of a network is beyond reasonable signal strength detected by the new device, the new device will not add the network to the list of table entries. This may be achieved by logging or uploading a database of signal statistics to the new device. For example, the maximum received signal strength for the common sense determination may be received via user input to the joining device, may be based on the commissioning area, may be received from an external device such as a diagnostic console, or may be a factory setting.

In another embodiment of the invention, the joining device may include one or more diversity entries in the table of entries. For example, in addition to the four entries ranked according to signal strength or as an alternative to one of the four entries, the joining device may include one or more networks with a lower RSSI value to make the process more robust. Advantageously, by including one or more diversity entries in the table, the PAN may avoid an island scenario where a group of devices in one area may hear each other well, but cannot talk reliably to a distant gateway. By choosing networks with all high RSSI, the joining device may only talk to that bunch and not be acquired by the gateway. However, by adding a low RSSI backup, the joining device may include in the table a node that is outside that island group and somewhere that can talk to the gateway.

Industrial Applicability

To solve the aforementioned problems, the present invention is a unique system in which a wireless device builds a list of available networks and makes a selection from this list to join a wireless network.

List Of Acronyms Used In The Detailed Description Of The Invention

The following is a list of the acronyms used in the specification in alphabetical order.
AV audio visual
FFD full function device
HVAC heating, ventilation, air conditioning
ISM industrial, science medical
LAN local area network
LED light emitting diode
PAN personal area network
PAN ID personal area network identification
RF radio frequency
RFD reduced function device
RSSI received signal strength indication
WAN wide area network

What is claimed is:

1. A wireless network device comprising:
(a) a personal area network (PAN) interface configured for communicating with one or more devices over a wireless medium;
(b) a memory encoding one or more processor executable instructions; and
(c) a processor configured to load the one or more processor-executable instructions when encoded from the memory, wherein the one or more processor-executable instructions, when executed by the processor, cause acts to be performed comprising:
(i) scanning one or more wireless communication channels for discoverable networks for a predetermined amount of time,
(ii) receiving network identity information for each of one or more discovered wireless PANs comprising a PAN ID over the one or more wireless communication channels,
(iii) measuring received signal strength of each of one or more discovered wireless PANs,
(iv) dynamically building a ranked table of one or more discovered wireless PANs by entering the first discovered wireless PAN in the table and for each subsequently discovered wireless PAN:
(1) comparing both a channel ID and the PAN ID of the subsequently discovered wireless PAN to entries in the table,
(2) when the channel ID and PAN ID matches an existing entry in the table and the received signal strength of the subsequently discovered wireless PAN is stronger than the received signal strength of the existing entry, adding the subsequently discovered wireless PAN to the table ranked according to received signal strength and removing the existing entry from the table,
(3) when the channel ID and PAN ID matches an existing entry in the table and the received signal strength of the subsequently discovered wireless PAN is weaker than the received signal strength of the existing entry, not adding the subsequently discovered wireless PAN to the table and keeping the existing entry in the table, and
(4) when the channel ID and PAN ID do not match an existing entry in the table, adding the subsequently discovered wireless PAN to the table ranked according to received signal strength, and
(v) attempting to join each wireless PAN in the table in order from strongest received signal strength to weakest received signal strength until a wireless PAN is successfully joined.

2. The wireless network device of claim 1 wherein the PAN interface is configured for communicating with one or more devices over a wireless medium according to a wireless communication protocol comprising a base protocol and a supplemental protocol and wherein the one or more processor-executable instructions, when executed by the processor, cause acts to be performed further comprising attempting to both join according to the base protocol and be acquired according to the supplemental protocol by each wireless PAN in the table in order from strongest received signal strength to weakest received signal strength until both a wireless PAN is successfully joined and the joining device is successfully acquired by the wireless PAN.

3. The wireless network device of claim 2 wherein the joining device is acquired by a wireless PAN by successfully participating in a handshake procedure.

4. The wireless network device of claim 1 wherein the one or more wireless communication channels are IEEE 802.15.4 channels 11 through 26.

5. The wireless network device of claim 1 wherein the ranked table comprises four entries and the one or more processor-executable instructions, when executed by the processor, cause acts to be performed comprising truncating one or more table entries according to received signal strength.

6. A wireless network system comprising:
(a) a network coordinating device comprising:
(i) a first personal area network (PAN) interface configured for transmitting network identity information comprising a PAN ID over a wireless communication channel via a communication protocol further comprising a base protocol and a supplemental protocol, receiving one or more control commands from a network device, and (ii) a power over Ethernet (PoE) interface configured for receiving an electric power signal and transmitting control commands to a control system;

(b) a joining network device comprising a personal area network (PAN) interface configured for communicating with one or more devices over a wireless medium, a memory encoding one or more processor executable instructions, and a processor configured to load the one or more processor-executable instructions when encoded from the memory, wherein the one or more processor-executable instructions, when executed by the processor, cause acts to be performed comprising (i) scanning one or more wireless communication channels for discoverable networks for a predetermined amount of time, (ii) receiving network identity information for each of one or more discovered wireless PANs comprising a PAN ID over the one or more wireless communication channels, (iii) measuring received signal strength of each of one or more discovered wireless PANs, (iv) dynamically building a ranked table of one or more discovered wireless PANs by entering the first discovered wireless PAN in the table and for each subsequently discovered wireless PAN:

(1) comparing both a channel ID and the PAN ID of the subsequently discovered wireless PAN to entries in the table, (2) when the channel ID and PAN ID matches an existing entry in the table and the received signal strength of the subsequently discovered wireless PAN is stronger than the received signal strength of the existing entry, adding the subsequently discovered wireless PAN to the table ranked according to received signal strength and removing the existing entry from the table, (3) when the channel ID and PAN ID matches an existing entry in the table and the received signal strength of the subsequently discovered wireless PAN is weaker than the received signal strength of the existing entry, not adding the subsequently discovered wireless PAN to the table and keeping the existing entry in the table, and (4) when the channel ID and PAN ID do not match an existing entry in the table, adding the subsequently discovered wireless PAN to the table ranked according to received signal strength, and (v) attempting to both join according to the base protocol and be acquired according to the supplemental protocol by each wireless PAN in the table in order from strongest received signal strength to weakest received signal strength until both a wireless PAN is successfully joined and the joining device is successfully acquired by the wireless PAN, and (vi) transmitting the ranked table to a diagnostic console;

(vii) transmitting one or more control commands to the network coordinating device upon successfully joining and being acquired by a wireless PAN; and (c) the diagnostic console comprising a display and configured for receiving the table of entries from the joining network device and displaying the table of entries on the display.

7. A method for a joining device to be commissioned in a wireless personal area network (PAN), said method comprising:

(a) scanning one or more wireless communication channels for discoverable networks for a predetermined amount of time;

(b) receiving network identity information for each of one or more discovered wireless PANs comprising a PAN ID over the one or more wireless communication channels;

(c) measuring received signal strength of each of one or more discovered wireless PANs;

(d) dynamically building a ranked table of one or more discovered wireless PANs by entering the first discovered wireless PAN in the table and for each subsequently discovered wireless PAN:

(i) comparing both a channel ID and the PAN ID of the subsequently discovered wireless PAN to entries in the table, (ii) when the channel ID and PAN ID matches an existing entry in the table and the received signal strength of the subsequently discovered wireless PAN is stronger than the received signal strength of the existing entry, adding the subsequently discovered wireless PAN to the table ranked according to received signal strength and removing the existing entry from the table, (iii) when the channel ID and PAN ID matches an existing entry in the table and the received signal strength of the subsequently discovered wireless PAN is weaker than the received signal strength of the existing entry, not adding the subsequently discovered wireless PAN to the table and keeping the existing entry in the table, and (iv) when the channel ID and PAN ID do not match an existing entry in the table, adding the subsequently discovered wireless PAN to the table ranked according to received signal strength; and (e) attempting to join each wireless PAN in the table in order from strongest received signal strength to weakest received signal strength until a wireless PAN is successfully joined.

8. The method of claim 7 wherein the one or more wireless communication channels are IEEE 802.15.4 channels 11 through 26.

9. The method of claim 7 wherein the predetermined amount of time is 260 ms.

10. The method of claim 7 wherein the table comprises n maximum entries and wherein the step of dynamically building a ranked table of one or more discovered wireless PANs further comprises the step of for each subsequently discovered wireless PAN:

(a) when the channel ID and PAN ID do not match an existing entry in the table and there are unpopulated entries in the table, adding the subsequently discovered wireless PAN to the table ranked according to received signal strength;

(b) when the channel ID and PAN ID do not match an existing entry in the table and there are not unpopulated entries in the table and the received signal strength of the subsequently discovered network is greater than the received signal strength of the lowest ranked existing entry, adding the subsequently discovered wireless PAN to the table ranked according to received signal strength and removing the lowest ranked existing entry from the table; and (c) when the channel ID and PAN ID do not match an existing entry in the table and there are not unpopulated entries in the table and the received signal strength of the subsequently discovered network is not greater than the received signal strength of the lowest ranked existing entry, not adding the subsequently discovered wireless PAN to the table and keeping the existing entry in the table.

11. The method of claim 10 wherein the table comprises four maximum entries.

12. The method of claim 7 further comprising the steps of attempting to join and be acquired by each of wireless PAN in the table in order from strongest received signal strength to weakest received signal strength until both a wireless PAN is successfully joined and the joining device has been successfully acquired by the wireless PAN.

13. The method of claim 7 further comprising the step of transmitting the ranked table of one or more discovered wireless PANs to a diagnostic console.

14. The method of claim 7 wherein the step of dynamically building a ranked table of one or more discovered wireless PANs further comprises the step of adding a diversity entry to the ranked table of one or more discovered wireless PANs.

15. The method of claim 14 wherein the step of dynamically building a ranked table of one or more discovered wireless PANs further comprises the step of for each subsequently discovered wireless PAN:
  (a) when the channel ID and PAN ID matches an existing entry in the table and the received signal strength of the subsequently discovered wireless PAN is weaker than the received signal strength of the existing entry, adding the subsequently discovered wireless PAN as the diversity entry to the ranked table.

16. The method of claim 12 further comprising the steps of:
  determining whether one level of retry has been used when a wireless PAN has not been joined and the joining device has not been acquired by at least the least ranked entry in the table; and
  when one level of retry has not been used, resetting the ranked table of entries and repeating steps (a)-(d).

17. The method of claim 7 wherein the step of dynamically building a ranked table of one or more discovered wireless PANs further comprises for each subsequently discovered wireless PAN:
  (a) comparing the received signal strength of the subsequently received wireless PAN with a maximum received signal strength; and
  (b) barring the subsequently received wireless PAN from the ranked table when the received signal strength is greater than the maximum received signal strength.

18. The method of claim 17 further comprising the step of receiving the maximum received signal strength for a commissioning area.

19. The method of claim 18 wherein the maximum received signal strength is received via user input.

20. The method of claim 19 wherein the maximum received signal strength is received from a diagnostic console.

* * * * *